(12) United States Patent
Kimura

(10) Patent No.: US 6,371,528 B1
(45) Date of Patent: Apr. 16, 2002

(54) FLUID PRESSURE DEVICE PIPE JOINT

(75) Inventor: Yasuhito Kimura, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/599,443

(22) Filed: Jun. 22, 2000

(30) Foreign Application Priority Data

Jul. 1, 1999 (JP) .......................................... 11-187940

(51) Int. Cl.$^7$ .......................... F16L 37/00; F16L 39/00
(52) U.S. Cl. ........................ 285/305; 285/321; 285/351
(58) Field of Search ............................. 285/305, 321, 285/332.3, 351

(56) References Cited

U.S. PATENT DOCUMENTS

| 3,450,424 | A | | 6/1969 | Calisher |
| 3,698,747 | A | | 10/1972 | Wing et al. |
| 3,753,582 | A | | 8/1973 | Graham |
| 4,009,896 | A | * | 3/1977 | Brewer ........................ 285/305 |
| 4,526,411 | A | * | 7/1985 | Bartholomew .............. 285/305 |
| 4,725,081 | A | * | 2/1988 | Bauer .......................... 285/305 |
| 4,884,829 | A | * | 12/1989 | Funk et al. ............. 285/305 X |
| 5,165,731 | A | | 11/1992 | Kimura |
| 5,433,489 | A | | 7/1995 | Kimura et al. |
| 5,607,087 | A | | 3/1997 | Wery et al. |

FOREIGN PATENT DOCUMENTS

| DE | 4310192 | * | 2/1994 | ................. 285/305 |
| EP | 0 327 441 | | 8/1989 | |
| FR | 2 454 074 | | 11/1980 | |

* cited by examiner

*Primary Examiner*—Neill Wilson
(74) *Attorney, Agent, or Firm*—Oblon, Spivak, McClelland, Maier & Neustadt, P.C.

(57) ABSTRACT

The present invention provides a pipe joint including: a socket mounted to a fluid pressure device; a joint main body to which a tube is connected; a stud having a base end portion connected to the joint main body and a tip end portion that can be connected to the socket; and an elastic clip for locking the stud and the socket in a connected state, in which the clip has a pair of paired members which extend in parallel with each other and can be opened and closed elastically and an operating portion for opening and closing the paired members, the socket has a pair of clip housing grooves into which the pair of paired members of the clip are fitted, and the stud has a tapered face for elastically spreading the paired members of the clip in the housing grooves as the stud is inserted into the socket and a locking groove into which the paired members of the clip are fitted and locked.

8 Claims, 4 Drawing Sheets

FLUID PRESSURE DEVICE PIPE JOINT

BACKGROUND OF THE INVENTION

The present invention relates to a pipe joint mounted to a fluid pressure device in use and more particularly to a pipe joint that can be easily attached to and detached from the fluid pressure device.

PRIOR ART

In general, in order to attach a pipe joint to a fluid pressure device, as disclosed in Japanese Patent Publication No. 6-86916, for example, a screwing portion 62 formed on a stud 61 of a pipe joint 51 is screwed into a pipe screw 55 formed on a fluid pressure device 53 side (see FIG. 8).

However, in such a prior-art pipe joint 51, it is necessary to turn the stud 61 the required number of turns to screw the stud 61 down into the pipe screw 55 of the above fluid pressure device 53 in mounting of the pipe joint 51 to the fluid pressure device 53. Therefore, a large number of operation steps are required and the operation steps are complicated. Moreover, a tool such as a spanner is indispensable for attaching and detach the pipe joint 51.

Furthermore, it is necessary to provide for maintenance of a sealed property between the pipe screw 55 of the fluid pressure device 53 and a screwing portion 62 of the stud 61 of the pipe joint 51 by winding sealing tape around the screwing portion 62, applying sealant to the screwing portion 62, or the like, which further complicates the operation steps.

SUMMARY OF THE INVENTION

It is a technical object of the present invention to provide a pipe joint which can be attached to and detached from a fluid pressure device easily without necessity of using a tool such as a spanner and by which the operation steps for attaching and detaching the pipe joint to and from the fluid pressure device become easy.

To achieve the above object, a pipe joint of the invention comprises: a cylindrical socket mounted to a fluid pressure device for forming a connecting opening of flow paths; a cylindrical stud connected by airtightly inserting a tip end portion of the stud into the socket through a seal member; a joint main body connected when airtightly fitted over a base end portion of the stud through a seal member; and an elastic clip for locking the stud and the socket fitted with each other in a connected state, wherein the clip has a pair of paired members which extend in parallel with each other and can be opened and closed elastically and an operating portion for opening and closing the paired members, the socket has a pair of parallel clip housing grooves into which the pair of paired members of the clip are fitted in positions facing each other on an outer side face of the socket, the clip housing grooves extending in directions orthogonal to an axis of the socket and being cut to have such a depth as to reach a hollow portion within the socket, and the stud has a tapered face tapered so as to elastically spread the paired members of the clip in the housing grooves as the stud is inserted into the socket and a locking groove which is formed in a position adjacent to a base end portion of the tapered face and into which the paired members of the clip are fitted and locked.

In the invention, it is preferable that the pipe joint is formed such that the clip in the housing grooves is rotated about the axis of the socket to cause the clip to climb onto an outer wall of the socket, to spread the pair of paired members by the outer wall, and to enable the stud to be drawn out and a shallow coming off preventing groove into which the paired members are fitted is formed to be connected to the housing grooves on the outer wall of the socket so as to prevent the clip which has climbed onto the outer wall from dropping.

According to a concrete embodiment of the invention, the operating portion of the clip is formed of a connecting portion for connecting one end portions of the pair of paired members to each other and is formed to have a different height from the paired members by bending the end portions of the paired members upward into hook shapes when viewed from sides.

According to another concrete embodiment of the invention, the operating portions of the clip are respectively formed on opposite ends of the pair of paired members, one of the operating portions is formed of a connecting portion for connecting one end portions of the pair of paired members and is formed to have a different height from the paired members by bending the end portions of the paired members upward into hook shapes when viewed from sides, and the other of the operating portions is formed of end portions of the paired members on open sides extending along an outer peripheral face of the socket to cross each other, tip end portions of the paired members being bent into hook shapes in such directions as to extend away from the outer peripheral face of the socket.

It is preferable that contact faces for suppressing rotation of the stud when the contact faces come in contact with each other are formed on the socket and the stud.

In the pipe joint of the invention having the above structure, in order to connect the stud mounted with the joint main body to the socket fixed to the fluid pressure device, the stud is inserted into the socket, the tapered face elastically pushes and spreads the paired members of the clip while moving, and then, the stud is pushed into such a position that the paired members are fitted into the locking groove of the stud.

On the other hand, in order to detach the stud from the socket, the operating portion of the clip is operated to elastically spread the paired members of the clip. In this state, the stud is drawn out of the socket.

In this manner, according to the pipe joint of the invention, the stud can be attached to and detached from the socket easily and in a short time without necessity of using a tool such as a spanner. Therefore, the operation steps for attaching and detaching the pipe joint to and from the fluid pressure device become easy and operability can be improved.

In the above pipe joint, it is possible to suppress coming off of the clip from the socket in rotation of the clip in detaching the stud from the socket by forming a clip coming off preventing groove adjacent to the clip housing grooves on an outer peripheral face of the socket.

It is possible to suppress rotation of the stud with respect to the socket by forming contact faces between the socket and the stud.

DETAILED DESCRIPTION

FIGS. 1 to 6 show an embodiment of a pipe joint according to the present invention.

Figure 1:
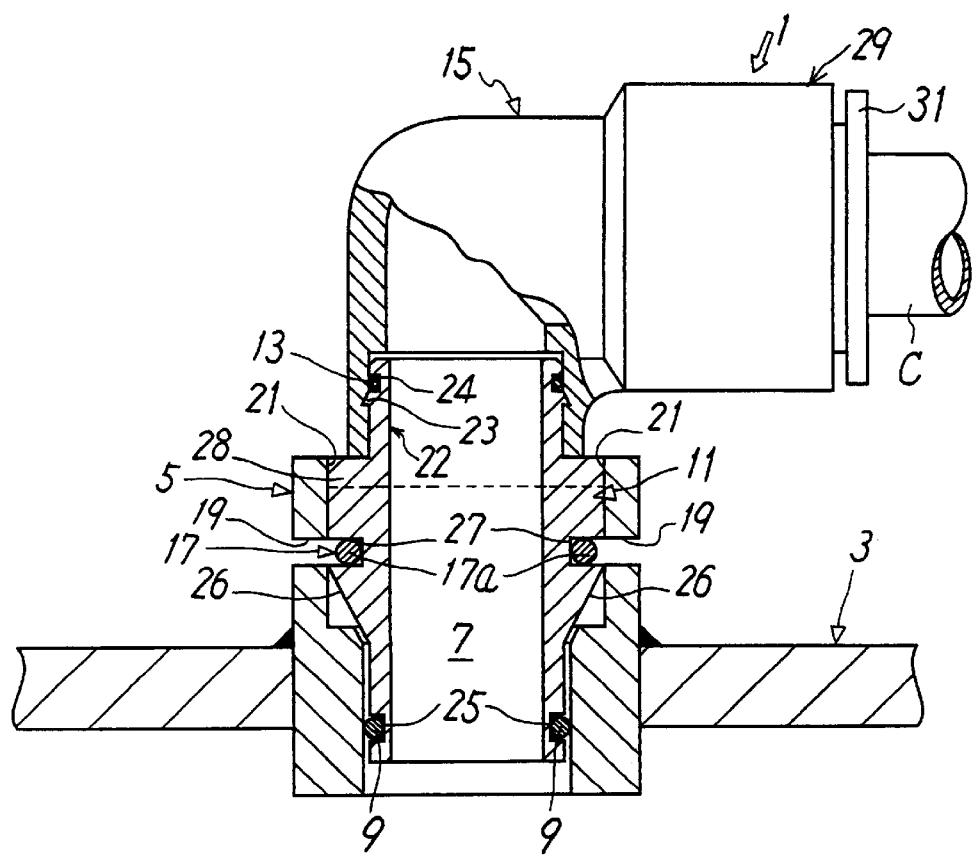
FIG. 1 is a partially cutaway front sectional view showing an embodiment of a pipe joint according to the present invention.
Figure 2:
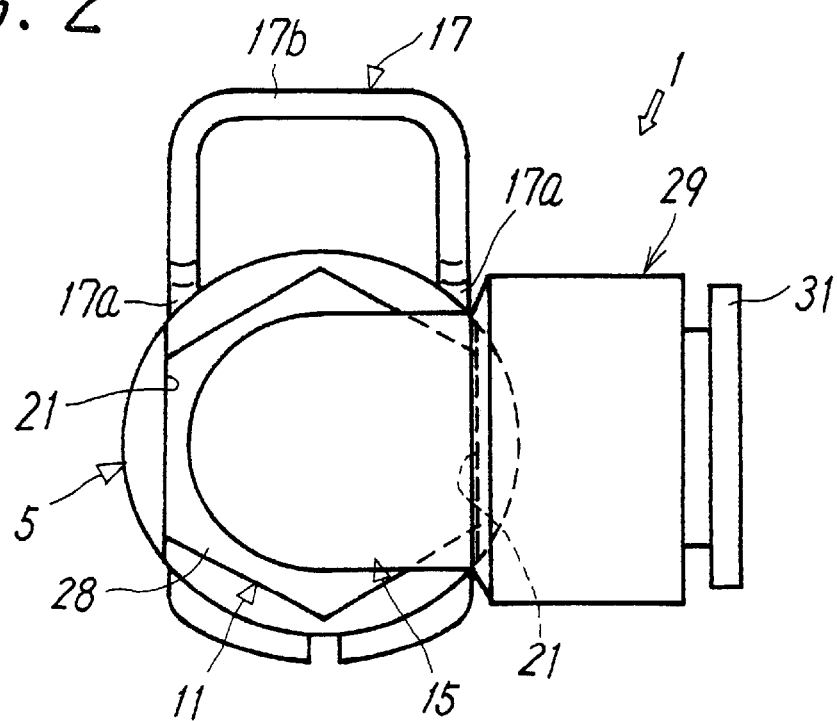
FIG. 2 is a plan view of the embodiment.
Figure 3:
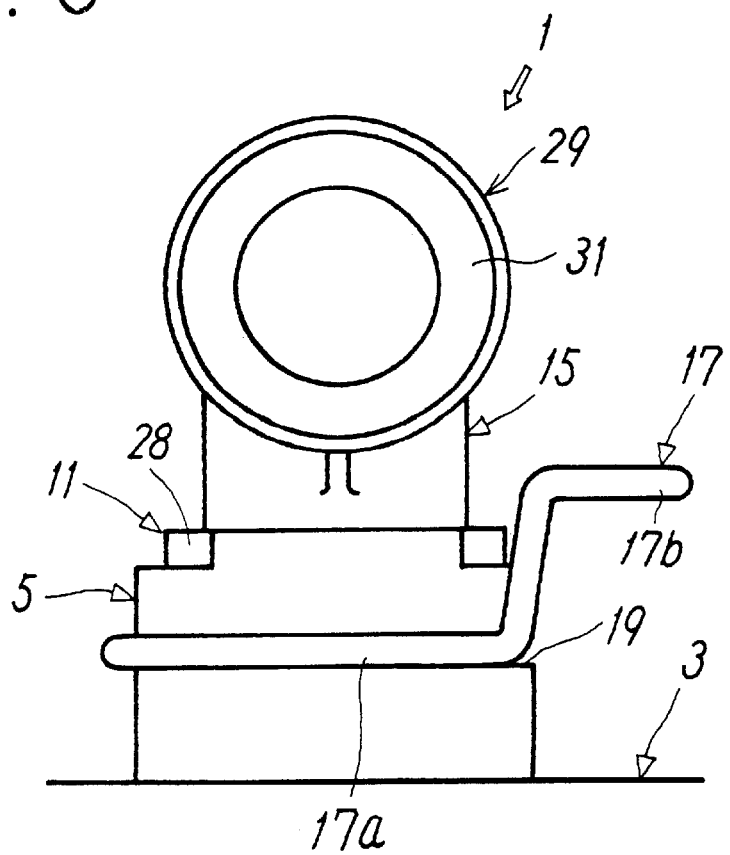
FIG. 3 is a right side view of the embodiment.
Figure 4:
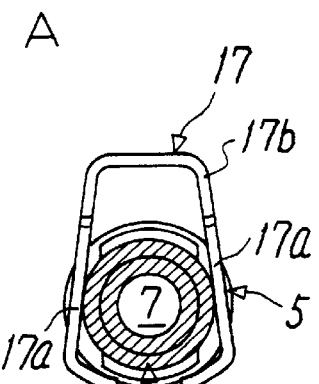
FIG. 4A is a plan sectional view taken along a line A—A and showing a state of fitting of a stud into a socket in the pipe joint of the invention and FIG. 4B is a partially cutaway front sectional view of the state.
Figure 4:
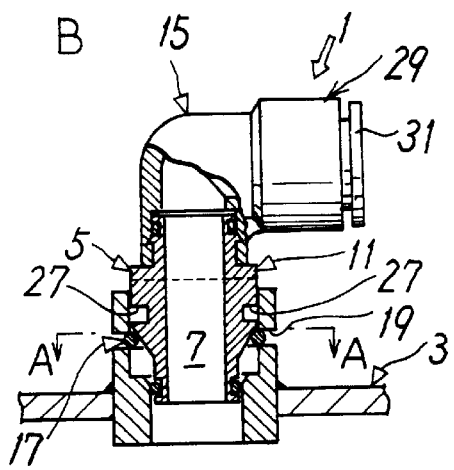
Figure 5:
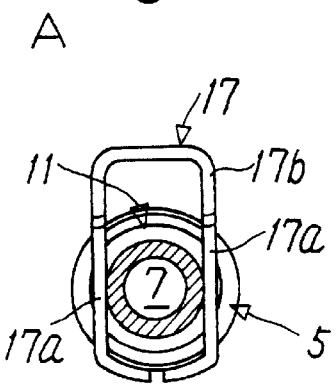
FIG. 5A is a plan sectional view showing a state of use of the pipe joint of the invention in the same position as FIG. 4A
FIG. 5B is a partially cutaway front sectional view of the state.
Figure 5:
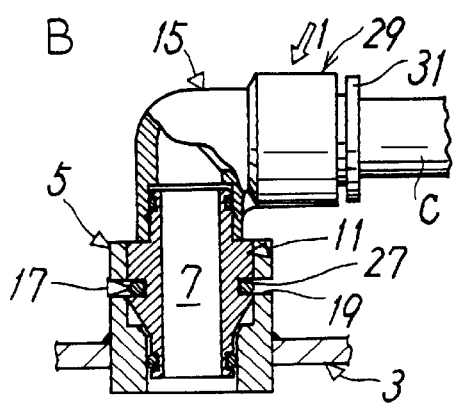

As specifically shown in FIGS. 1 to 3, the pipe joint 1 has a substantially cylindrical socket 5 mounted to a fluid pressure device 3 and forming a connecting opening of flow paths and a substantially cylindrical stud 11 having a flow path 7 for fluid inside the stud 11 and connected by airtightly inserting a tip end portion of the stud 11 into the socket 5 through an O-ring 9 as a seal member, a joint main body 15 connected when fitted airtightly over a base end portion of the stud 11 through an O-ring 13 as a seal member, and an elastic clip 17 for locking the stud 11 and the socket 5 fitted with each other in a connected state.

Figure 6:
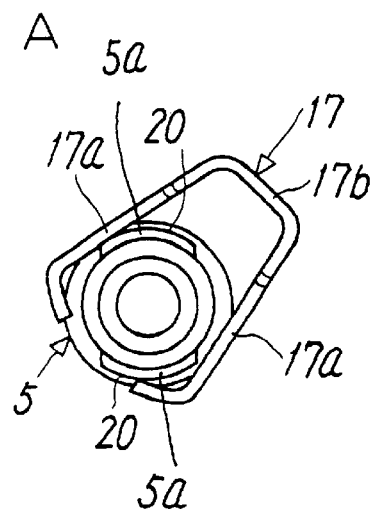
FIG. 6A is a plan sectional view showing a state of detaching of the stud from the socket in the same position as FIG. 4A
FIG. 6B is a partially cutaway front sectional view of the state.
Figure 6:
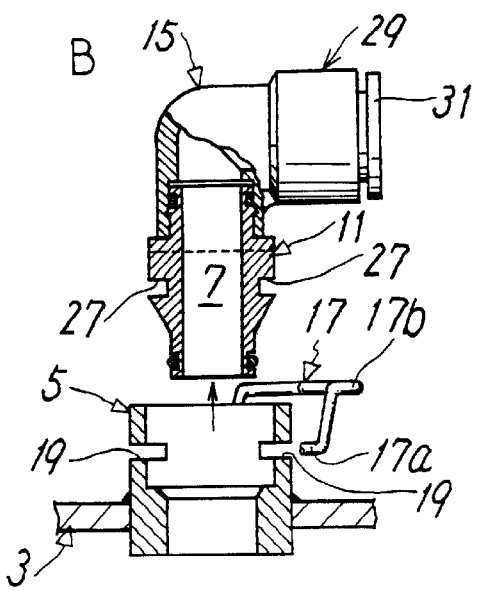

The socket 5 is fixed to the fluid pressure device 3 by proper means such as welding and a pair of parallel clip housing grooves 19, 19 into which paired members 17a, 17a of the clip 17 are fitted are formed in positions facing each other on an outer side face of the socket 5. The clip housing grooves 19, 19 extend in a direction orthogonal to an axis of the socket 5 and are cut to have such a depth as to reach a hollow portion within the socket 5. As shown in FIG. 6, shallow coming off preventing grooves 20, 20 into which the above paired members 17a, 17a are fitted are formed to be connected to the above housing grooves 19, 19 on an outer face of a socket outer walls 5a, 5a positioned between the housing grooves 19, 19 so as to prevent the clip 17 from dropping when the clip 17 in the housing grooves 19, 19 is caused to climb onto the outer walls 5a, 5a by rotating the clip 17 about the axis of the socket 5 to spread the pair of paired members 17a, 17a in drawing out of the stud 11.

A pair of contact faces 21, 21 formed of flat faces are formed in parallel to each other in positions facing each other at an end portion of the socket 5 on a side mounted with the stud 11. Two outer faces 28a, 28a of a hexagonal portion 28 of the stud 11 come into contact with the contact faces 21, 21, thereby connecting the stud 11 to the socket 5 in a state in which rotation of the stud 11 is limited.

The stud 11 has on an end side thereof a press-fitted portion 22 press-fitted into an opening of the joint main body 15. The stud 11 has on an outer periphery of the press-fitted portion 22 a locking portion 23 locked onto an inner peripheral face of the opening of the joint main body 15 and a groove 24 into which the O-ring 13 is fitted. The stud 11 has on the other end side thereof a groove 25 into which the O-ring 9 for airtightly providing sealing between the stud 11 and the inner peripheral face of the socket 5. The stud 11 has a tapered face 26 tapered so as to elastically spread the paired members 17a, 17a of the clip 17 as the stud 11 is inserted into the socket 5. Moreover, in a position adjacent to a base end portion of the tapered face 26, the stud 11 has a locking groove 27 which corresponds to the clip housing grooves 19 of the socket 5 and into which the clip 17 is fitted and locked to retain the stud 11 in a state in which coming off of the stud 11 is prevented.

The stud 11 has the hexagonal portion 28 on the end portion of the stud 11 on a side provided with the press-fitted portion 22 of the stud 11. When the stud 11 is fitted into the socket 5, the outer faces 28a, 28a of the hexagonal portion 28 face the contact faces 21, 21 of the socket 5 to suppress rotation of the stud 11 with respect to the socket 5.

The joint main body 15 has a shape of an elbow and has a tube connecting portion 29 at an end portion of the joint main body 15 on a side opposite to a side connected to the stud 11. The tube connecting portion 29 has a known quick-type joint structure having seal material, a locking portion locked by biting into an outer wall of a tube C (both of which are not shown), and a release member 31 to be pushed into the tube connecting portion 29 to cancel locking of the locking portion and to enable the tube C to be drawn out. However, the joint structure may be other structures as long as the tube C can be connected to the structure. The shape of the joint main body 15 is not limited to the elbow and a half; the like may be applied to the joint main body 15.

The clip 17 is for preventing the stud 11 from coming off from the socket 5 and has the pair of paired members 17a, 17a which extend in parallel with each other and can be opened and closed elastically and an operating portion 17b for opening and closing the paired members 17a, 17a. The operating portion 17b is formed of a connecting portion for connecting one ends of the paired members 17a, 17a to each other and has a different height from the paired members by bending the end portions of the paired members upward into hook shapes when viewed from sides. By holding the operating portion 17b and rotating the clip 17, the paired members 17a, 17a of the clip 17 are spread.

In the pipe joint 1 having the above structure, in order to attach the stud 11 to the socket 5 provided to the fluid pressure device 3, as shown in FIGS. 4A and 4B, the stud 11 is inserted and pushed into the socket 5 to such a position that the tapered face 26 moves while elastically spreading the paired members 17a, 17a of the clip 17 and passes between the paired members 17a, 17a. Thus, the paired members 17a, 17a are fitted into the coming off preventing groove 27 of the stud 11 (see FIGS. 5A and 5B).

On the other hand, in order to detach the stud from the socket 5, as shown in FIGS. 6A and 6B, the operating portion 17b is held and the clip 17 is rotated about the axis of the socket 5 and caused to climb onto the outer walls 5a, 5a. Thus, the pair of paired members 17a, 17a are spread by the outer walls 5a, 5a, and as a result, the paired members 17a, 17a are detached from the stud and the stud can be drawn out.

In this case, because the clip coming off preventing grooves 20, 20 connected to the clip housing grooves 19, 19 are provided to the outer faces of the outer walls 5a, 5a, it is possible to prevent the clip 17 from coming off from the socket 5 when the clip 17 is rotated and caused to climb onto the outer walls 5a, 5a.

As described above, the pipe joint 1 of the invention can be attached to and detached from the fluid pressure device 3 easily and in a short time without necessity of using a tool such as a spanner. Therefore, the operation steps for attaching and detaching the pipe joint 1 to and from the fluid pressure device become easy and operability can be improved.

Figure 7:
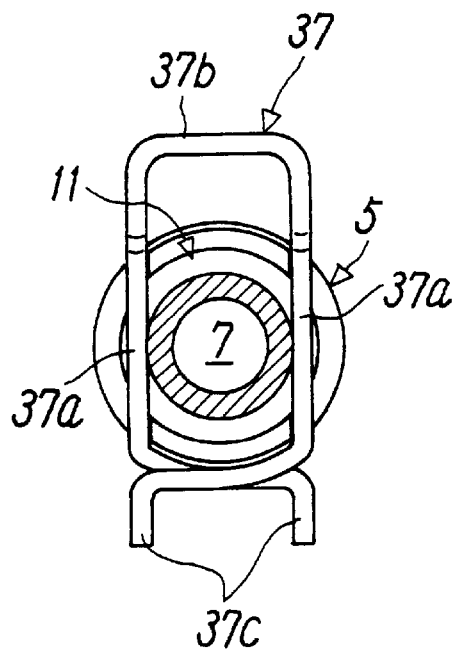
FIG. 7A is a plan sectional view showing a state of mounting of a stud to a socket in another embodiment of the pipe joint of the invention in the same position as FIG. 4A
FIG. 7B is a plan sectional view showing a state of detaching of the stud from the socket in the same position as FIG. 4A.
Figure 7:
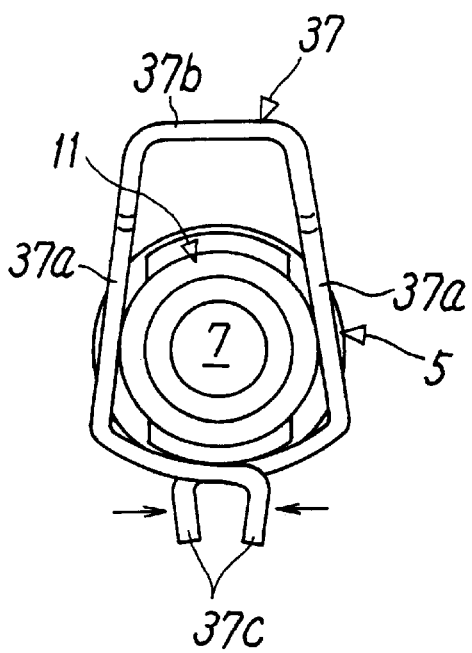
Figure 8:
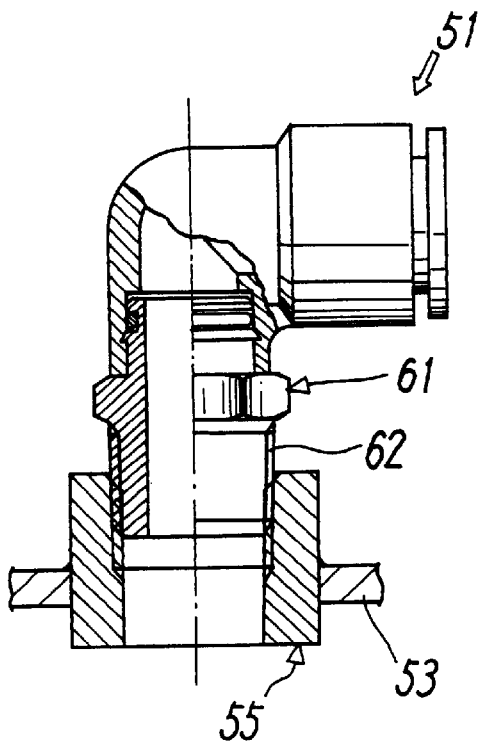
FIG. 8 is a partially cutaway front sectional view of a prior-art pipe joint.

The structure of the clip 17 of the pipe joint of the invention is not limited to that in the above embodiment but may be a structure shown in FIGS. 7A and 7B.

Specifically, in a clip 37, end portions of paired members 37a, 37a on open sides extend along an outer peripheral face of the socket 5 to cross each other and tip end portions of the paired members 37a, 37a are bent into hook shapes in such directions as to extend away from the outer peripheral face of the socket 5 to form an operating portion 37c to be pinched between a thumb and fingers.

With this structure, because the paired members 37a, 37a of the clip are spread when the operating portion 37c is pinched, it is possible to detach the stud 11 from the socket 5 more easily.

Although the stud 11 can be detached from the socket 5 by only operating the operating portion 37c of the above clip 37, it is of course possible to detach the stud 11 from the socket 5 by cooperation between the operating portion 37c and an operating portion 37b.

According to the pipe joint of the invention that has been described above specifically, the pipe joint can be attached to and detached from the fluid pressure device easily and in a short time without necessity of using a tool such as a spanner. Therefore, the operation steps for attaching and detaching the pipe joint to and from the fluid pressure device become easy and operability can be improved.

What is claimed is:

1. A pipe joint comprising: a cylindrical socket mounted to a fluid pressure device for forming a connecting opening of flow paths;
    a cylindrical stud connected by airtightly inserting a tip end portion of said stud into said socket through a seal member;
    a joint main body connected when airtightly fitted over a base end portion of said stud through a seal member, and
    an elastic clip for locking said stud and said socket fitted with each other in a connected state, wherein said clip has a pair of paired members which extend in parallel with each other and can be opened and closed elastically and an operating portion for opening and closing said paired members, said socket has a pair of parallel clip housing grooves into which said pair of paired members of said clip are fitted in positions facing each other on an outer side face of said socket, said clip housing grooves extending in directions orthogonal to an axis of said socket and being cut to have such a depth as to reach a hollow portion within said socket, and said stud has a tapered face tapered so as to elastically spread said paired members of said clip in said housing grooves as said stud is inserted into said socket and a locking groove which is formed in a position adjacent to a base end portion of said tapered face and into which said paired members of said clip are fitted and locked, wherein said pipe joint is formed such that said clip in said housing grooves is rotated about said axis of said socket to cause said clip to climb onto an outer wall of said socket, to spread said pair of paired members by said outer wall, and to enable said stud to be drawn out and a shallow coming off preventing groove into which said paired members are fitted is formed to be connected to said housing grooves on said outer wall of said socket so as to prevent said clip which has climbed onto said outer wall from dropping.

2. A pipe joint according to claim 1, wherein said operating portion of said clip is formed of a connecting portion for connecting one end portions of said pair of paired members to each other and is formed to have a different height from said paired members by bending said end portions of said paired members upward into hook shapes when viewed from sides.

3. A pipe joint according to claim 1, wherein said operating portions of said clip are respectively formed on opposite ends of said pair of paired members, one of said operating portions is formed of a connecting portion for connecting one end portions of said pair of paired members and is formed to have a different height from said paired members by bending said end portions of said paired members upward into hook shapes when viewed from sides, and the other of said operating portions is formed of end portions of said paired members on open sides extending along an outer peripheral face of said socket to cross each other, tip end portions of said paired members being bent into hook shapes in such directions as to extend away from said outer peripheral face of said socket.

4. A pipe joint according to any one of claims 1, 2, or 3, wherein contact faces for suppressing rotation of said stud when said contact faces come in contact with each other are formed on said socket and said stud.

5. A pipe joint comprising: a cylindrical socket mounted to a fluid pressure device for forming a connecting opening of flow paths; a cylindrical stud connected by airtightly inserting a tip end portion of said stud into said socket through a seal member; a joint main body connected when airtightly fitted over a base end portion of said stud through a seal member; and an elastic clip for locking said stud and said socket fitted with each other in a connected state, wherein said clip has a pair of paired members which extend in parallel with each other and can be opened and closed elastically and an operating portion for opening and closing said paired members, said socket has a pair of parallel clip housing grooves into which said pair of paired members of said clip are fitted in positions facing each other on an outer side face of said socket, said clip housing grooves extending in directions orthogonal to an axis of said socket and being cut to have such a depth as to reach a hollow portion within said socket, and said stud has a tapered face tapered so as to elastically spread said paired members of said clip in said housing grooves as said stud is inserted into said socket and a locking groove which is formed in a position adjacent to a base end portion of said tapered face and into which said paired members of said clip are fitted and locked;
    wherein said operating portions of said clip are respectively formed on opposite ends of said pair of paired members, one of said operating portions is formed of a connecting portion for connecting one end portions of said pair of paired members and is formed to have a different height from said paired members by bending said end portions of said paired members upward into hook shapes when viewed from sides, and the other of said operating portions is formed of end portions of said paired members on open sides extending along an outer peripheral face of said socket to cross each other, tip end portions of said paired members being bent into hook shapes in such directions as to extend away from said outer peripheral face of said socket.

6. A pipe joint comprising: a cylindrical socket mounted to a fluid pressure device for forming a connecting opening of flow paths; a cylindrical stud connected by airtightly inserting a tip end portion of said stud into said socket through a seal member; a joint main body connected when airtightly fitted over a base end portion of said stud through a seal member; and an elastic clip for locking said stud and said socket fitted with each other in a connected state, wherein said clip has a pair of paired members which extend in parallel with each other and can be opened and closed elastically and an operating portion for opening and closing said paired members, said socket has a pair of parallel clip housing grooves into which said pair of paired members of said clip are fitted in positions facing each other on an outer side face of said socket, said clip housing grooves extending in directions orthogonal to an axis of said socket and being cut to have such a depth as to reach a hollow portion within said socket, and said stud has a tapered face tapered so as to elastically spread said paired members of said clip in said housing grooves as said stud is inserted into said socket and a locking groove which is formed in a position adjacent to a base end portion of said tapered face and into which said paired members of said clip are fitted and locked;

wherein contact faces for suppressing rotation of said stud when said contact faces come in contact with each other are formed on said socket and said stud.

7. A pipe joint comprising: a cylindrical socket mounted to a fluid pressure device for forming a connecting opening of flow paths; a cylindrical stud connected by airtightly inserting a tip end portion of said stud into said socket through a seal member; a joint main body connected when airtightly fitted over a base end portion of said stud through a seal member; and an elastic clip for locking said stud and said socket fitted with each other in a connected state, wherein said clip has a pair of paired members which extend in parallel with each other and can be opened and closed elastically and an operating portion for opening and closing said paired members, said socket has a pair of parallel clip housing grooves into which said pair of paired members of said clip are fitted in positions facing each other on an outer side face of said socket, said clip housing grooves extending in directions orthogonal to an axis of said socket and being cut to have such a depth as to reach a hollow portion within said socket, and said stud has a tapered face tapered so as to elastically spread said paired members of said clip in said housing grooves as said stud is inserted into said socket and a locking groove which is formed in a position adjacent to a base end portion of said tapered face and into which said paired members of said clip are fitted and locked;

wherein said operating portion of said clip is formed of a connecting portion for connecting one end portions of said pair of paired members to each other and is formed to have a different height from said paired members by bending said end portions of said paired members upward into hook shapes when viewed from sides;

wherein contact faces for suppressing rotation of said stud when said contact faces come in contact with each other are formed on said socket and said stud.

8. A pipe joint comprising: a cylindrical socket mounted to a fluid pressure device for forming a connecting opening of flow paths; a cylindrical stud connected by airtightly inserting a tip end portion of said stud into said socket through a seal member; a joint main body connected when airtightly fitted over a base end portion of said stud through a seal member; and an elastic clip for locking said stud and said socket fitted with each other in a connected state, wherein said clip has a pair of paired members which extend in parallel with each other and can be opened and closed elastically and an operating portion for opening and closing said paired members, said socket has a pair of parallel clip housing grooves into which said pair of paired members of said clip are fitted in positions facing each other on an outer side face of said socket, said clip housing grooves extending in directions orthogonal to an axis of said socket and being cut to have such a depth as to reach a hollow portion within said socket, and said stud has a tapered face tapered so as to elastically spread said paired members of said clip in said housing grooves as said stud is inserted into said socket and a locking groove which is formed in a position adjacent to a base end portion of said tapered face and into which said paired members of said clip are fitted and locked;

wherein said operating portions of said clip are respectively formed on opposite ends of said pair of paired members, one of said operating portions is formed of a connecting portion for connecting one end portions of said pair of paired members and is formed to have a different height from said paired members by bending said end portions of said paired members upward into hook shapes when viewed from sides, and the other of said operating portions is formed of end portions of said paired members on open sides extending along an outer peripheral face of said socket to cross each other, tip end portions of said paired members being bent into hook shapes in such directions as to extend away from said outer peripheral face of said socket;

wherein contact faces for suppressing rotation of said stud when said contact faces come in contact with each other are formed on said socket and said stud.

* * * * *